United States Patent Office ──

3,189,580
Patented June 15, 1965

3,189,580
POLYHYDROPOLYBORATE GROUP-CONTAINING POLYMERS
James Wilkinson Dawes, Wilmington, Del., assignor to E. I. du Pont de Nemours and Company, Wilmington, Del., a corporation of Delaware
No Drawing. Filed Apr. 17, 1962, Ser. No. 189,235
10 Claims. (Cl. 260—78.4)

This invention relates to polymeric materials. More particularly, it relates to polymeric materials which contain boron and to their preparation.

Polymeric compositions form a large and varied group of commercial products which are used extensively in plastics, films, fibers, coating compositions and related fields. The expanding industrial technology continually uncovers new areas for which polymeric compositions with unusual properties are needed. Thus, in applications which involve exposure to high temperatures, polymeric compositions of unusual thermal stability are desired. A need exists for polymeric compositions which can be molded and which will resist breakdown on exposure to high temperatures.

Thermally stable polymers have now been found which have, as characteristic recurring units, polyhydropolyborate groups of 10 or 12 boron atoms joined by polycarbacyl groups which are bonded solely to boron, each recurring polyborate group having a negative valence (or negative ionic charge) of 2, which valences are satisfied by an atom or group of atoms capable of forming a cation in aqueous solution.

The polymers of the present invention are further defined as products whose average composition is represented by the following formula:

$$[M_a(B_nH_{n-2y}X_y)_b]_c \qquad (1)$$

where M is a cation having a valence of 1–3; X is a polyvalent polycarbacyl group joined to boron atoms of two or more recurring polyborate units; $a$ and $b$ are positive whole numbers of 1–3 whose values are determined by the valence of M, i.e., $a$ multiplied by the valence of M is equal to $2b$; $n$ is 10 or 12; $y$ is a positive number of 1 to $n/2$ inclusive; and $c$ is a positive number of at least 3.

In a preferred form of the invention, X is a divalent dicarbacyl group of 3–12 carbons and $c$ is a positive number of 5–500, inclusive. Especially preferred products are polymeric compositions in which $c$ is a positive number of 10–200, inclusive.

The group within the brackets in Formula 1 can also be viewed as representing the average composition of the recurring unit in the polymeric product.

When $n=10$ in Formula 1, the average composition of the polymeric product is represented by the following formula:

$$[M_a(B_{10}H_{10-2s}X_s)_b]_c \qquad (2)$$

where M, X, $a$, $b$, and $c$ are defined as in Formula 1 and $s$ is a positive number of 1–5, inclusive.

When $n=12$ in Formula 1, the average composition of the polymeric product is represented as follows:

$$[M_a(B_{12}H_{12-2t}X_t)_b]_c \qquad (3)$$

where M, X, $a$, $b$, and $c$ are defined as in Formula 1 and $t$ is a positive number of 1–6, inclusive.

In Formula 1 the chemical unit within the brackets is composed of two principal groups, viz., $(B_nH_{n-2y}X_y)^{-2}$ and $M^+$. Each of these groups is discussed in the paragraphs which follow.

The group $(B_nH_{n-2y}X_y)^{-2}$—Bonds through which polymer formation occurs emanate from this portion of the recurring unit. One-half of the bonds emanate from boron atoms and one-half from the X substituents. The boron-containing group behaves as a divalent anion. It forms acids and salts by combining with groups represented by M which bear positive ionic charges, i.e., groups which behave as cations.

The boron-containing group or moiety, $B_nH_{n-2y}X_y{}^{-2}$, consists of a cage of 10 or 12 boron atoms which displays exceptional chemical stability. The group reacts as a unit in chemical processes; it is not readily degraded or broken into smaller parts. In many chemical reactions this component behaves in a manner which resembles the behavior of carbocyclic aromatic compounds, e.g., benzene, toluene or naphthalene. It is this unusual "aromatic" behavior of the boron-containing moiety that permits the introduction of the X groups or substituents. These substituents are important and characterizing components of the boron-containing component.

The substituent X.—This group, as defined earlier, is a polyvalent carbacyl group which is bonded to boron atoms of separate recurring polymeric units. A polyvalent carbacyl group is the polyvalent radical obtained by removal of acid hydroxyl groups from a polybasic carboxylic acid. The polyvalent carbacyl group contains at least two carbonyl $$\overset{O}{\underset{\|}{(-C-)}}$$

groups which, preferably, are separated by at least one carbon. In its preferred form, therefore, the group X is represented by the following formula:

$$-\overset{O}{\underset{\|}{C}}-R-\overset{O}{\underset{\|}{C}}- \qquad (4)$$

where R is an aliphatically saturated hydrocarbon radical of, preferably, at most 16 carbons. In an especially preferred form, R is an aliphatically saturated hydrocarbon radical of 2 to 10 carbon atoms. R, therefore, is free of olefinic and acetylenic unsaturation. It can be straight chain, branched chain or cyclic, i.e., cycloalkyl and aryl, or a combination of open chain and cyclic, e.g., aralkyl and arylcycloalkyl, and the like. To illustrate, R can be —CH$_2$—, —CH$_2$CH$_2$CH$_2$—, —CH$_2$CH(CH$_3$)CH$_2$—
—CH$_2$(CH$_2$)$_3$CH$_2$—, —CH$_2$(CH$_2$)$_8$CH$_2$—
—CH$_2$(CH$_2$)$_{10}$CH$_2$—, —C$_6$H$_{10}$—, —C$_6$H$_4$—
—C$_6$H$_3$(CH$_3$)—, —C$_{10}$H$_6$—, —CH$_2$CH$_2$C$_6$H$_4$—, and the like.

The group M—This group is an element or a combination of elements which carries a positive ionic charge of 1–3 and the members of this group have in common the property of forming cations in aqueous solution. The properties of M are not a critical feature of the polymers of the invention and M, therefore, represents a broad range of elements or combinations of elements. To illustrate, M can be hydrogen, hydronium (H$_3$O$^+$), a metal, ammonium (NH$_4{}^+$), hydrazonium (NH$_2$—NH$_3{}^+$), N-substituted ammonium (primary, secondary, tertiary and quaternary), N-substituted hydrazonium (mono-, di- and tri-substituted), S-substituted sulfonium, P-substituted phosphonium, metal-ammine complexes

[e.g., Zn(NH$_3$)$_4{}^{+2}$, Co(NH$_3$)$_6{}^{+3}$]

and the like. To illustrate more specifically, M can be lithium, sodium, cesium, beryllium, barium, lanthanum, cerium, thallium, zirconium, vanadium, manganese, iron, cobalt, copper, zinc, mercury, aluminum, tin, lead, antimony, bismuth, silver or any other metal. As furthermore specific examples, M can be R'NH$_3{}^+$, R$_2$'NH$_2{}^+$, R'$_3$NH$^+$, R$_4$'N$^+$, (R'NHNH$_3$)$^+$, (R$_2$'N—NH$_3$)$^+$, (R$_3$'S)$^+$, and (R$_4$'P)$^+$, where the R' groups represent organic radicals. These groups are not critical features of the compounds of the invention; they can be open chain or cyclic, saturated or unsaturated and the groups can be composed of rings of which the nitrogen or phosphorus is a member, e.g., pyridyl, quinolyl, morpholino, hexamethylenimino, and the like. Preferably, for reasons of availability, R' is an aliphatically saturated group of at most 18 carbons which can be singly bonded to the N, S, or P or it can form a ring of at most 6 members with these elements. R' can be alkyl, cycloalkyl, aryl, alkaryl, aralkyl, and the like.

The cation-forming group M can be present in the reactants used to prepare the polymer or the group can be introduced into the polymer by simple metathetic reactions which are described later. These methods provide means for obtaining products in which M covers a wide range of elements or combinations of elements.

Polymer composition and properties—The number of X groups in each unit of Formula 1 is not necessarily the same. It will be evident from the description, given later, of methods for preparing the polymers that several X groups can be bonded to one boron-containing unit and that these X groups can each be bonded further to different boron-containing units. Formulas 1 through 3 represent therefore the average composition of the polymeric products and the recurring units.

The molecular weight or total number of recurring units in the polymeric products is difficult to determine accurately. Inherent viscosities of the polymers, measured in solution in dimethylacetamide, show that the products have, as a minimum, three recurring units and that they can have as high as 500 such units. The molecular weight of the polymers will, of course, be affected by the number of recurring units and by the number and size of the X groups and M groups. The molecular weight generally lies between about 600 and about 100,000. For most products the number of recurring units lies between about 5 and about 200 and the molecular weight lies between about 1000 and 40,000.

The polymeric products, as isolated, frequently contain water of hydration. The products can be dried at very low pressures and at elevated temperatures to obtain substantially anhydrous compositions.

Specific examples of polymeric compositions of the invention are as follows:

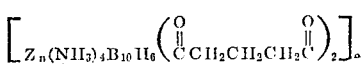
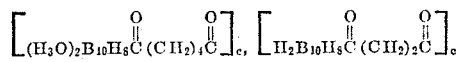
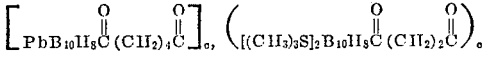
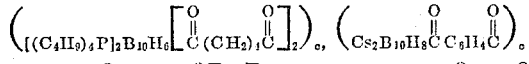
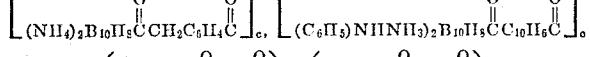
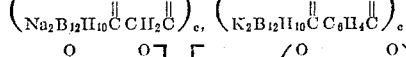
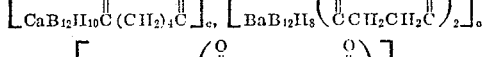
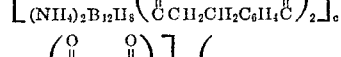
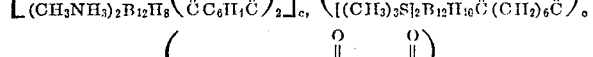
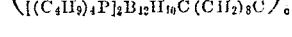
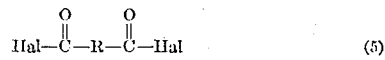

and the like.

The subscript $c$ represents the number of recurring units as defined previously.

The polymers are insoluble or only very slightly soluble in hydroxylated solvents, e.g., water, methanol, ethanol, and the like. Polymers in which the number of X groups is small, e.g., three or less, generally dissolve in organic liquids such as acetonitrile, dialkylformamides, dialkylacetamides, and the like. Polymers which contain a large number of X groups are usually insoluble in most organic liquids. The polymers can be molded in conventional equipment into desired shapes and forms, generally at a temperature of not over 400° C.

The polymers function as ion-exchange reagents. To illustrate, a polymer of Formula 1, where M is sodium, can be washed with an aqueous solution of a strong inorganic acid, e.g., sulfuric acid, to obtain the acid form of the polymer (where $M=H^+$ or $H_3O^+$) and the acid form can be washed with aqueous hydrazine to form the hydrazonium salt, i.e., $M=NH_2NH_3^+$. This property of the polymer permits the preparation of a wide range of salts.

Preparation of polymers—The products of the invention are obtained by reacting the following groups of compounds in the presence of an acid catalyst:

(1) A polyhydropolyborate of the formula $M_a(B_nH_n)_b$ where M, $n$, $a$ and $b$ are defined as in Formula 1, and (2) A polyacyl halide of a polycarboxylic acid having at least two, and preferably at least three carbon atoms.

The polyhydropolyborates employed as reactants are decahydrodecaborates and dodecahydrododecaborates of the formulas $M_a(B_{10}H_{10})_b$ and $M_a(B_{12}H_{12})_b$, where M, $a$ and $b$ are defined as in Formula 1. M, of course, can be an element or group of elements which forms a cation, but, for economic reasons, it is preferred to use polyhydropolyborates in which M is hydrogen, hydronium ($H_3O^+$), ammonium ($NH_4^+$), an alkali metal or an alkaline earth metal. Decahydrodecaborates and dodecahydrododecaborates are not readily available materials and their preparation is illustrated in the examples.

The polyacyl halides which are preferred as reactants are compounds of the formula $$Hal-\overset{O}{\overset{\|}{C}}-R-\overset{O}{\overset{\|}{C}}-Hal \qquad (5)$$

where "Hal" is chlorine or bromine and R is defined as in Formula 4. The group R is carried through the reaction unchanged and the discussion of R under Formula 4 applies also to the present formula. Polyacyl chlorides are usually readily available and they form a preferred group of reactants.

The acid catalyst employed in the process is generally a strong acid, e.g., an acid whose $pK_a$ is at least equal to p-toluenesulfonic acid. Examples of compounds which can be used as catalysts are the mineral acids (sulfuric, hydrochloric, phosphoric), highly halogenated organic acids (trichloroacetic acid, trifluoroacetic acid), polymeric acids (polyphosphoric acid), and the like. The compounds, $H_2B_{10}H_{10}$ and $H_2B_{12}H_{12}$ or their hydrates are strong acids and, in the event these compounds are used as reactants, no further acid catalyst is needed in the reaction.

The reaction is continued in conventional vessels which, preferably, have corrosion-resistant inner surfaces, e.g., glass, platinum, stainless steel, poly(tetrafluoroethylene)resin and the like. In a batch process the polyhydropolyborate and the acid catalyst are charged into the vessel which may, if desired, be flushed with an inert gas to remove adventitious moisture from the system. The reaction mixture is stirred and the polyacyl halide is added gradually. The reaction generally proceeds readily with release of hydrogen halide gas which can be conveniently removed from the vessel by a stream of inert gas. The mixture is stirred for a short time and it can be heated to bring the reaction to completion.

The reaction can also be conducted in an inert solvent, if desired, to improve the contact between the reagents. Suitable solvents are hydrocarbons (benzene, toluene, octane), nitriles (acetonitrile, propionitrile, benzonitrile) and halogenated hydrocarbons (tetrachloroethane, perfluorocyclohexane). It is not essential, however, to use a solvent.

The reaction can also be conducted in a continuous process. To illustrate, the polyhydropolyborate, acid catalyst and polycarboxylic acid halide are fed continuously into a reaction chamber at the desired temperature and, after a short reaction time, the products are removed continuously for purification.

The molar ratio in which the reactants are used is not critical. The ratio, moles of polyhydropolyborate/moles of polyacyl halide, can be as low as 0.1 and as high as 20. Preferably, for economic reasons, the mole ratio lies between 1.0 and 10.

Temperature is not a critical factor in the process. The reaction is conducted conveniently in most cases at prevailing atmospheric temperature (about 25° C.), but lower or higher temperatures can be employed, for example, as low as −20° C. and as high as 300° C., or higher. Operation is generally satisfactory at temperatures between about 0° and 150° C. The temperature can be raised during the progress of the reaction to bring it to completion.

The time of the reaction is determined to some extent by the method employed, whether continuous or batch, and by the temperature of the reaction. The reaction generally proceeds rapidly and, in a batch process, it is completed in from 0.5 to 2.0 hours. In a continuous process, which is usually operated at a higher temperature than a batch process, the time for reaction is very short, on the order of minutes. Time is, therefore, not a critical factor in the process.

The reaction is conducted most conveniently at atmospheric pressure. Higher or lower pressures can be used but little advantage is gained by operating under these conditions.

Polyacid halides are usually reactive with water. It is, preferable, therefore, to conduct the process under substantially anhydrous conditions to obtain maximum utilization of the polyacid halide in the reaction. The presence of minor amounts of water will not render the process inoperable but yields of desired products may be reduced.

The polymeric products are isolated and purified by conventional methods. Most conveniently, the reaction mass is mixed thoroughly with water or other hydroxyl-bearing compound (e.g., alcohols) and the polymer which precipitates is separated. The polymer can be washed with suitable liquids to remove soluble monomeric compounds. The product is then dried by the usual procedures. The product, when air-dried, usually contains solvent of hydration which is associated primarily with the cation-forming group M.

The products of the invention and processes for obtaining them are illustrated in the following examples. The preparation of representative polyhydropolyborates which are employed as reactants is also described.

*Example A*

A. PREPARATION OF A BIS(DIMETHYLSULFIDE) DECABORANE(12)

A reaction vessel having a capacity of about 365 parts of water is charged with 0.79 part of decaborane(14), cooled in liquid nitrogen, and then evacuated to a pressure of 10 microns of mercury. Approximately 21 parts of methyl sulfide is condensed onto the decaborane in the reaction vessel. The reaction vessel is closed, allowed to warm to room temperature (about 25° C.) and stand for 4 days. During this period, 6.6 millimoles of hydrogen is evolved. The reaction vessel is opened and excess methyl sulfide is removed by distillation, leaving a practically quantitative yield of white solid residue of $B_{10}H_{12} \cdot 2S(CH_3)_2$. The compound is recrystallized from ethyl acetate and it melts at 122–124° C. The compound is called bis(dimethylsulfide)decaborane(12).

B. PREPARATION OF $M_a(B_{10}H_{10})_b$ (where M is $NH_4$)

Bis(dimethylsulfide)decaborane(12) (8.5 g.) is mixed with 50 ml. of liquid ammonia and stirred in a round-bottom reaction vessel for one hour with the vessel being cooled to a temperature of about −50° C. by partial immersion in a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of diammonium decahydrodecaborate(2−), i.e., $(NH_4)_2B_{10}H_{10}$.

*Example B*

A. A pressure vessel (capacity, 400 ml.) is charged with 19.0 g. of sodium hydroborate ($NaBH_4$) and 75 ml. of dry triethylamine. The vessel is cooled in a solid carbon dioxide-acetone bath and the internal pressure is reduced to less than 1.0 mm. pressure by means of a vacuum pump. Diborane (36.0 g.) is introduced into the vessel which is then closed. The mixture is heated with agitation for 10 hours at 180° C. After cooling the vessel and venting to remove volatile products, there remains a solid residue which is washed from the vessel with 1,2-dimethoxyethane(glyme). The solid is separated by filtration and it is again washed with glyme. The washed solid is dissolved in hot tetrahydrofuran and the solution is filtered to remove a small quantity of insoluble product. The filtrate is heated to boiling and glyme is added slowly until solid material begins to separate. The mixture is chilled and it is then filtered to separate the white crystals. These crystals are washed with glyme and dried at less than 0.001 mm. pressure at 90–100° C. to yield 43.9 g. of $Na_2B_{12}H_{12}$ containing glyme and water of solvation. Further treatment of the filtrate yields an additional 5.4 g. of the product.

B. The product of Part A is recrystallized from a large quantity of diethyl ether to obtain a hydrate of $Na_2B_{12}H_{12}$, free of glyme as solvent of crystallization, i.e., the product is $Na_2B_{12}H_{12}$ containing water of crystallization.

*Example I*

A round-bottom reaction vessel is charged with 2.51 g. of $(NH_4)_2B_{10}H_{10}$ and 40 ml. of polyphosphoric acid. The vessel is fitted with a dropping funnel, mechanical stirrer, condenser and gas inlet and exit tubes. Nitrogen gas is passed into the vessel to maintain a blanket of inert gas above the reaction mixture. A solution of 3.31 g. of terephthalyl chloride in 50 ml. of acetonitrile is added dropwise through the funnel to the reaction mixture which is stirred. The addition is conducted at prevailing atmospheric temperature (about 25° C.). After stirring for a few minutes, the reaction mixture turns reddish-brown and becomes very viscous. Hydrogen chloride is present in the effluent nitrogen gas. The mixture is stirred for 2 hours until release of hydrogen chloride is complete. The solution is stirred with 500 ml. of water and the brown precipitate which forms is separated by filtration. It is washed with water and dried under reduced pressure at 50° C. to obtain a brown polymer whose inherent viscosity in solution in dimethylacetamide is 0.310. Elemental analysis shows that the product is a polymer of Formula 1 in which $n=10$ and $y=1$, and each recurring unit is associated with one mole of water of hydration. The identity of the polymer is also confirmed by its infrared absorption spectrum (potassium bromide wafer).

*Analysis*—Calc'd for

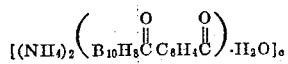

B, 35.7; C, 31.8; H, 7.29. Found: B, 33.05; C, 30.83; H, 6.67.

The value of $c$ lies between about 3 and 100.

Example II

A reaction vessel of the type described in Example I is charged with 10 g. of the dihydrate of $Na_2B_{12}H_{12}$, 30 ml. of polyphosphoric acid and 4.0 g. of phosphorus pentoxide. The mixture is stirred and 10.68 g. of sebacyl chloride is added dropwise with stirring at about 25° C. After addition of sebacyl chloride is completed, the solution is stirred for 4 hours at about 25° C., then heated to 75° C. and stirred 8 hours at this temperature. The reaction mixture is cooled and processed as described in Example I. There is obtained 10 g. of a brown polymeric product of Formula 1 in which $n=12$ and $y=2$, and each recurring unit is associated with two moles of water of hydration.

*Analysis*—Calc'd for

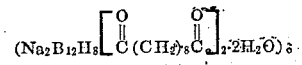

B, 23.2; C, 43.1; H, 7.90. Found: B, 19.3; C, 43.1; H, 7.32.

The identity of the polymer is further confirmed by its infrared absorption spectrum.

Example III

A reaction vessel of the type described in Example I is charged with 10 g. of the dihydrate of $Na_2B_{12}H_{12}$, 30 ml. of polyphosphoric acid and 3.0 g. of phosphorus pentoxide. A total of 8.16 g. of adipyl chloride is added dropwise to the reaction mixture with stirring at atmospheric temperature (about 25° C.). Hydrogen chloride is evolved and stirring is continued for about 6.5 hours when evolution of hydrogen chloride is complete. The reaction mixture is treated with 500 ml. of water and a gummy orange product forms. The product is separated by filtration, washed and dried to obtain 3.0 g. of a reddish polymer whose inhernt viscosity in solution in dimethylacetamide inherent viscosity in solution in dimethylacetamide is at least 0.285. The product is a polymer of Formula 1 where $n=12$ and $y=1.5$, and each recurring unit is associated with 5 moles of water of hydration.

*Analysis*—Calc'd for

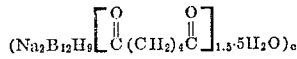

B, 29.3; C, 24.4; H, 7.22. Found: B, 25.37; C, 24.74; H, 7.57.

Example IV

The procedure of Example III is repeated except that the solution is stirred 4 hours at atmospheric temperature (about 25° C.), then heated to 75° C. and stirred for 8 more hours. The mixture is processed as described in Example III to obtain 2.0 g. of a dark brown glassy polymer which is insoluble in conventional organic solvents, e.g., alcohol, acetone, benzene, diethyl ether, ethyl acetate, and the like.

The polymer is a product of Formula 1 in which $n=12$ and $y=2$, and each recurring unit is associated with 4 moles of water of hydration.

*Analysis*—Calc'd for

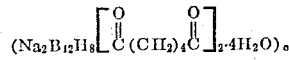

B, 27.1; C, 30.0; H, 6.67. Found: B, 26.6; C, 30.26; H, 7.15.

The identity of the product is further confirmed by its infrared absorption spectrum.

The processes illustrated in Example I–IV are generic to the preparation of the polymers of the invention. Any metal salt having the $B_{10}H_{10}{}^{-2}$ or $B_{12}H_{12}{}^{-2}$ can be used in the processes but, as stated earlier, for economic reasons it is preferred to use the acids or the alkali metal, alkaline earth metal or ammonium salts. The acids or salts desired for use as reactants can be obtained by simple metathetic reactions from $(NH_4)_2B_{10}H_{10}$ or $Na_2B_{12}H_{12}$. For example, either of these salts in aqueous solution can be passed through an acidic ion-exchange column to yield aqueous solutions of the acids, $H_2B_{10}H_{10}$ and $H_2B_{12}H_{12}$. The acidic solutions can be evaporated to yield hydronium salts or they can be neutralized with alkali metal hydroxides, alkaline earth metal carbonates and the like to obtain the desired salts for use as reactants.

To illustrate further, $K_2B_{10}H_{10}$ can be reacted with adipyl chloride to yield

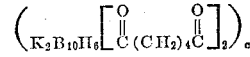

$CaB_{10}H_{10}$ can be reacted with succinyl chloride to yield

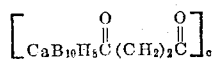

$BaB_{10}H_{10}$ can be reacted with malonyl chloride to yield

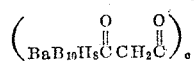

$SrB_{12}H_{12}$ can be reacted with the acid chloride of glutaric acid to yield

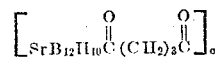

$Cs_2B_{12}H_{12}$ can be reacted with isophthalyl chloride to yield

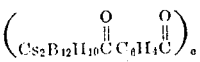

$Li_2B_{12}H_{12}$ can be reacted with the acid chloride of pimelic acid to yield

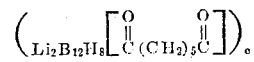

$MgB_{12}H_{12}$ can be reacted with the acid chloride of octadecanedioic acid to yield

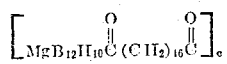

$(NH_4)_2B_{12}H_{12}$ can be reacted with the acid chloride of 1,4-cyclohexanedicarboxylic acid to yield

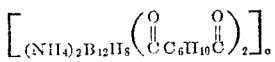

and $Li_2B_{10}H_{10}$ and $MgB_{12}H_{12}$ can be reacted with the acid chloride of dodecanedioic acid to yield

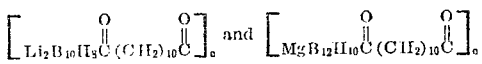

respectively.

*Utility*.—The products of the invention are generically useful in the field of molding powders. To illustrate, the polymer of Example II is molded in a compression unit at 250° C. and 30,000 p.s.i. to form a coherent opaque film which is useful as a liner or spacer in fabricated articles. The products of the invention can be used alone as molding powders or they can be admixed with inert fillers or with other polymeric products. The polymers of the invention can be admixed, e.g., with wood flour, finely divided cellulose, polystyrene and the like to form molding powders.

The polymers of the invention are generically useful as ion-exchange resins. Thus, polymers of Formula 1 where M is sodium can be brought into contact with aqueous solutions of strong acids to form the sodium salt of that acid and a polymer of Formula 1 in which M is H+. The latter polymers, i.e., compounds of the formula $(H_2B_nH_{n-2y}X_y)_c$, are useful as acidic ion-exchange resins to remove unwanted cations from solution, e.g., to absorb traces of methylamines from water or to remove traces of calcium ions from solution.

As many apparently satisfactorily different embodiments of this invention may be made without departing from the spirit and scope thereof, it is to be understood that this invention is not limited to the specific embodiments thereof as defined in the appended claims.

The embodiments of the invention in which an exclusive property or privilege is claimed are defined as follows:

1. Polymers comprising recurring units of polyhydropolyborate groups containing $n$ boron atoms wherein $n$ is an integer selected from the group consisting of 10 and 12, joined by recurring polycarbacyl groups which are bonded to boron atoms of separate recurring polyhydropolyborate groups through the carbonyl carbons of the polycarbacyl groups, wherein each polyhydropolyborate group has a negative valence of 2, which valences are satisfied by a cation having a valence of 1–3.

2. Polymers having the general formula $$[M_a(B_nH_{n-2y}X_y)_b]_c$$

wherein M is a cation having a valence of 1–3; X is a polyvalent polycarbacyl group joined to boron (B) atoms of at least two recurring polyborate units; $a$ and $b$ are positive whole numbers 1–3 and whose values are determined by the valence of M; $n$ is an integer selected from the class consisting of 10 and 12; $y$ is a positive number of 1 to $n/2$, inclusive; and $c$ is a positive number of at least 3.

3. Polymers of claim 2 wherein X contains 3–12 carbon atoms and $c$ is a positive number of from 5 to 500, inclusive.

4. Polymers of claim 2 wherein $n$ is 10.

5. Polymers of claim 2 wherein $n$ is 12.

6. Process which comprises reacting in the presence of an acid catalyst a compound of the formula $$M_a(B_nH_n)_b$$

wherein M is a cation having a valence of 1–3, $n$ is an integer selected from the class consisting of 10 and 12, and $a$ and $b$ are positive whole numbers of 1–3 and whose values are determined by the valence of M, with a polyacyl halide of the formula $$\text{Hal}-\overset{\overset{\displaystyle O}{\|}}{C}-R-\overset{\overset{\displaystyle O}{\|}}{C}-\text{Hal}$$

wherein Hal is a group selected from the class consisting of Cl and Br, and R is an aliphatically saturated hydrocarbon of 1–16 carbon atoms, and isolating the resulting product.

7. The process of claim 6 wherein an inert solvent is employed.

8. The process of claim 6 wherein the reaction is carried out under substantially anhydrous conditions.

9. A polymer of claim 2 in which M is NH$_4$, X is $$-\overset{\overset{\displaystyle O}{\|}}{C}-C_6H_4-\overset{\overset{\displaystyle O}{\|}}{C}-$$

$n$ is 10, and $y$ is 1.

10. A polymer of claim 2 in which M is Na, X is $$-\overset{\overset{\displaystyle O}{\|}}{C}-(CH_2)_8-\overset{\overset{\displaystyle O}{\|}}{C}-$$

$n$ is 12, and $y$ is 2.

No references cited.

MURRAY TILLMAN, *Primary Examiner*.

O. R. VERTIZ, SAMUEL H. BLECH, *Examiners*.